United States Patent
Saeki et al.

(10) Patent No.: US 7,731,874 B2
(45) Date of Patent: Jun. 8, 2010

(54) METHOD OF MOLDING OPTICAL COMPONENT

(75) Inventors: Tatsuhiko Saeki, Odawara (JP); Masanori Utsugi, Saitama (JP)

(73) Assignees: FUJIFILM Corporation, Tokyo (JP); FUJINON CORPORATION, Saitama (JP)

( * ) Notice: Subject to any disclaimer, the term of this patent is extended or adjusted under 35 U.S.C. 154(b) by 0 days.

(21) Appl. No.: 11/715,458

(22) Filed: Mar. 8, 2007

(65) Prior Publication Data

US 2007/0212438 A1  Sep. 13, 2007

(30) Foreign Application Priority Data

Mar. 9, 2006 (JP) .............................. 2006-064756

(51) Int. Cl.
*B29C 43/04* (2006.01)

(52) U.S. Cl. .................. 264/2.7; 264/1.1; 264/2.2; 264/2.3; 264/239; 264/320; 425/400; 425/410; 425/411; 425/423; 425/808; 65/305; 65/323

(58) Field of Classification Search ................ 425/406, 425/408, 808, 517, 400, 410–411, 415, 417, 425/423, 469, 470, 352, 403, 168, 383, 398; 264/1.1, 2.2, 2.3, 2.7, 77, 239, 259, 319, 264/320, 496; 65/323, 305, 224, 223, 104
See application file for complete search history.

(56) References Cited

U.S. PATENT DOCUMENTS 5,817,161 A * 10/1998 Takagi et al. .................. 65/102
6,832,495 B2 * 12/2004 Hosoe .......................... 65/323

FOREIGN PATENT DOCUMENTS

| JP | 01153544 | * | 6/1989 |
| JP | 06305747 | * | 11/1994 |
| JP | 2002225086 A | * | 8/2002 |
| JP | 2004-262734 A | | 9/2004 |

* cited by examiner

*Primary Examiner*—Steven P Griffin
*Assistant Examiner*—Seyed M Malekzadeh
(74) *Attorney, Agent, or Firm*—Sughrue Mion, PLLC

(57) ABSTRACT

A method of molding an optical component which includes providing a first mold and a second mold which mold the optical component, a cylindrical body whose rotational symmetry axis is identical with a second symmetry axis about which a second mold is rotationally symmetric, a trunk mold whose rotational symmetry axis is identical with a first symmetry axis about which a first mold is rotationally symmetric, a supporting means which supports the first mold in such a way that the first mold moves relatively to the trunk mold in parallel with the first symmetry axis, and a second tapered surface and a first tapered surface which contacts the second tapered surface, which connect the cylindrical body with the trunk mold in such a way that the second symmetry axis is identical with the first symmetry axis.

11 Claims, 3 Drawing Sheets

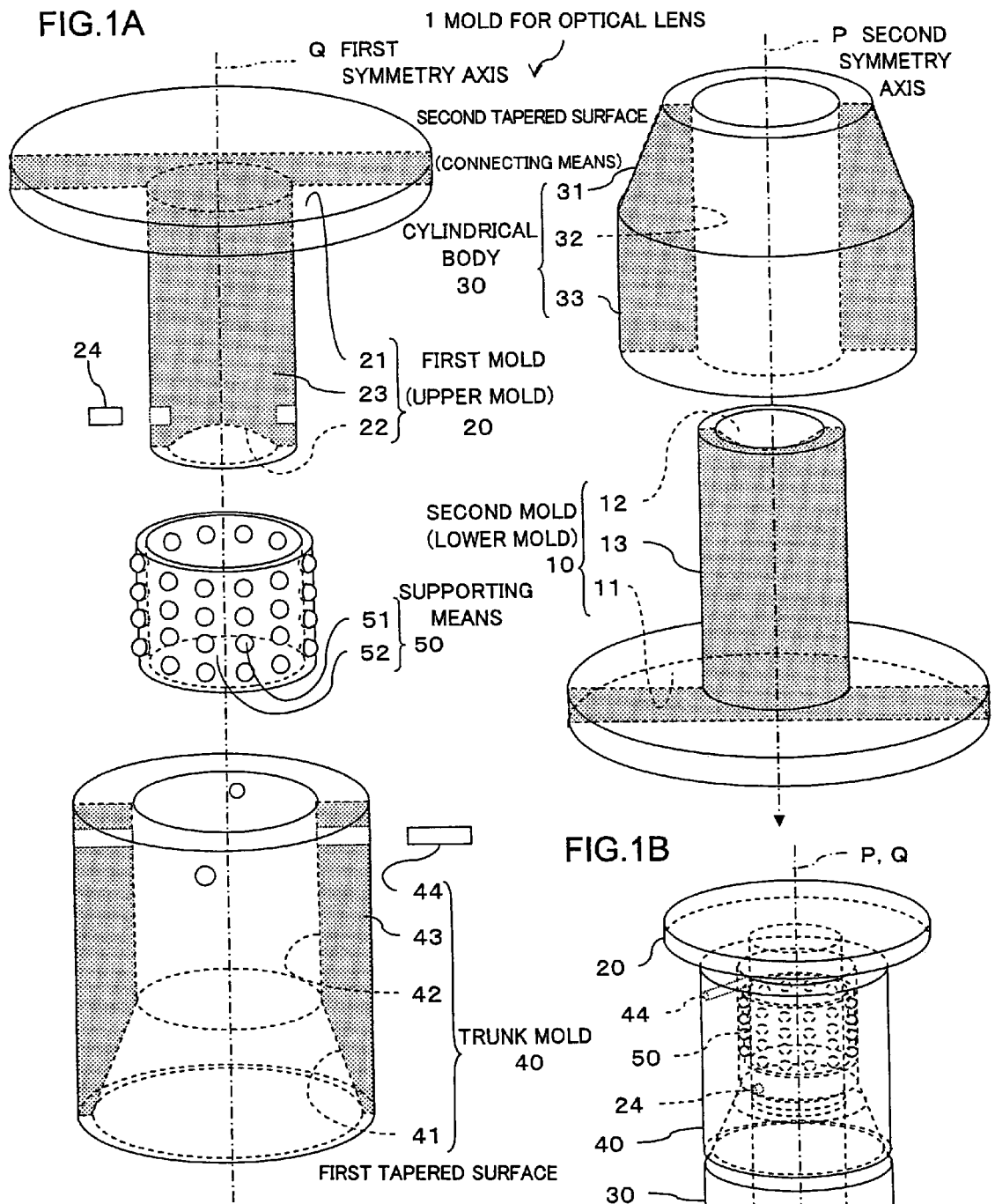

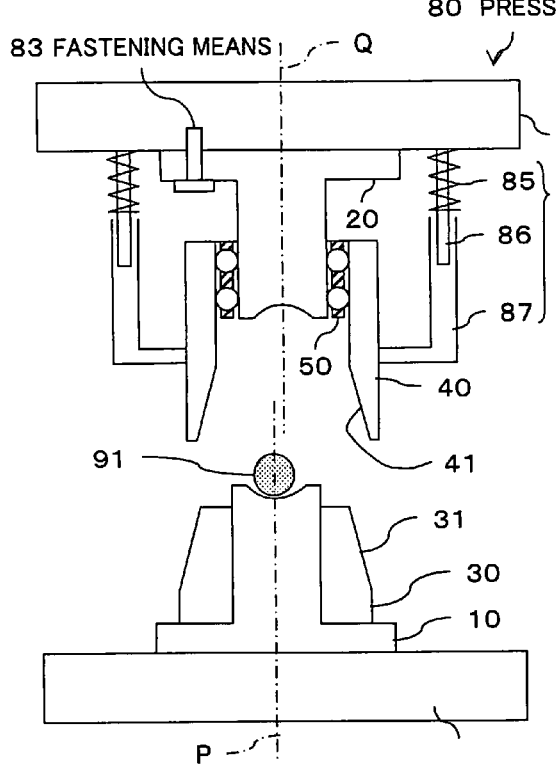
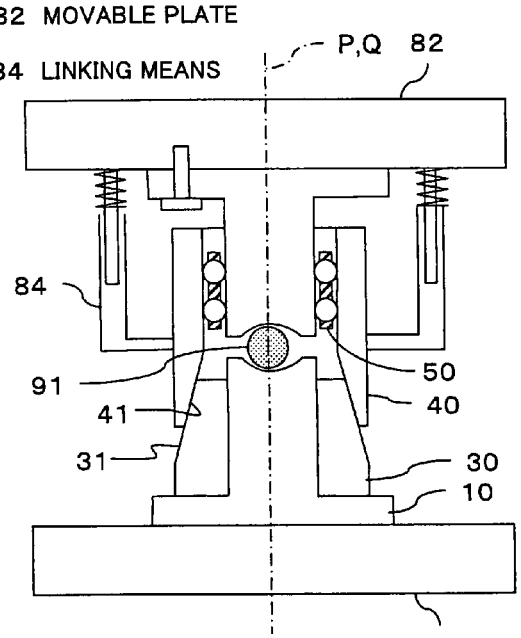
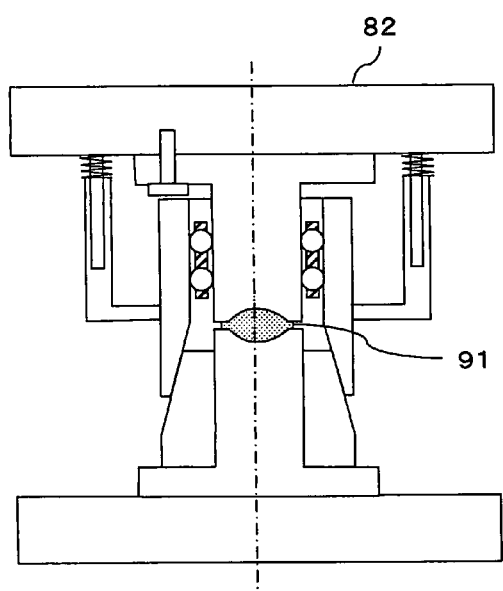
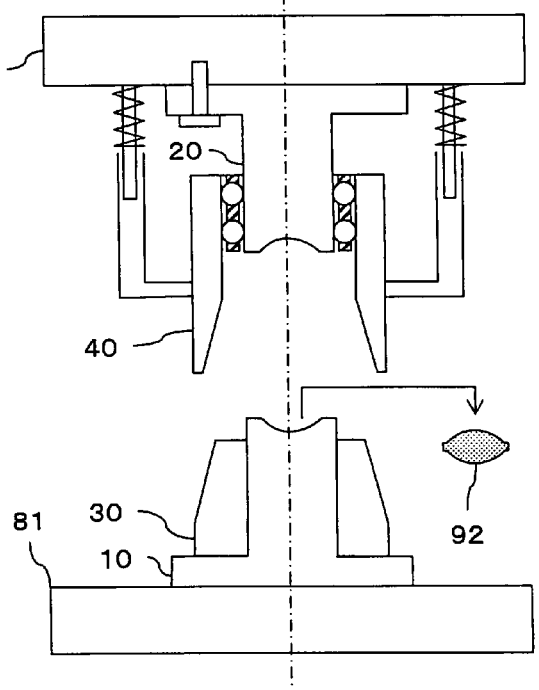

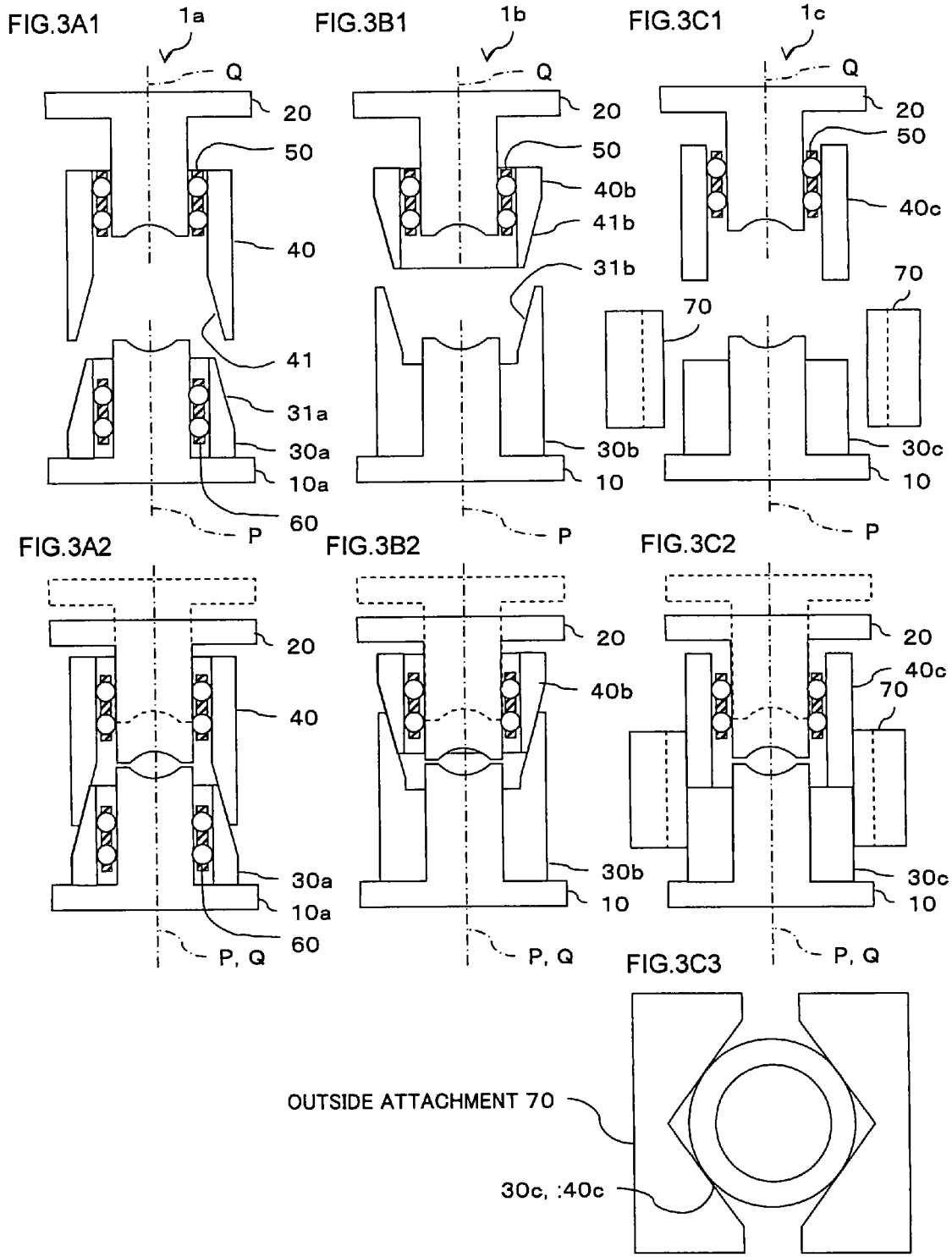

METHOD OF MOLDING OPTICAL COMPONENT

CROSS REFERENCE TO RELATED APPLICATIONS

This application claims the foreign priority benefit under Title 35, United States Code, §119(a)-(d) of Japanese Patent Application No. 2006-064756, filed on Mar. 9, 2006 in the Japan Patent Office, the disclosure of which is herein incorporated by reference in its entirety.

BACKGROUND OF THE INVENTION

1. Field of the Invention

The present invention relates to a technical field of pressing heat-softened material to mold an optical component using a mold divided into a first mold (an upper mold) and a second mold (a lower mold) which face each other, more specifically, a mold for an optical component to achieve a molding process with high accuracy.

2. Description of the Related Art

In recent years, a highly accurate molding process is required for an optical lens (an optical component) with advanced functions has been developed. Therefore, studies of molding techniques are promoted to meet the requirement. In particular, to mold an optical lens, a technology for highly accurately centering a mold (a first mold and a second mold) which is repeatedly closed and opened is one of essential molding technologies.

Here, to center a mold means to align rotational symmetry axes of the first mold (the lower mold) which molds a lens surface of the optical lens and the second mold (the upper mold) which molds the other lens surface of the optical lens in a state where the mold is closed.

To achieve centering of a mold with high accuracy, conventionally, a mold for an optical lens is well-known in which a plurality of rolling objects are cylindrically arranged, and in which side surfaces of a lower mold and an upper mold are inscribed with the cylindrically arranged rolling objects. In this structure, both of the lower mold and the upper mold are centered coaxially by the rolling objects and relatively move along rotational symmetry axes of the both in a state where the rotational symmetry axes are identical with each other. Therefore, the mold for the optical lens can be repeatedly closed and opened in a state where the lower mold and the upper mold are centered (See JP2004-262734A).

SUMMARY OF THE INVENTION

However, according to the conventional mold for the optical lens described above, after the mold is closed, when the mold is opened in order that the molded optical lens is taken out, it is required to pull out from the cylindrically arranged rolling objects either one of the upper mold or the lower mold which is supported by the rolling objects. Therefore, when the mold for the optical lens is repeatedly closed and opened, the upper mold and the lower mold hit hard each other every time when the upper mold or the lower mold is put back to the cylindrically arranged rolling objects. Therefore, there is a problem that consequent wear-out or breakage of the mold accelerates deterioration of the mold so as to shorten a life-cycle of the mold.

To solve such a problem, the present invention provides a mold for an optical component in which a molded optical component (optical lens) can be taken out without pulling out an upper mold or a lower mold of the mold for the optical component off the arranged rolling objects. Thus, centering accuracy of the optical component is improved. Moreover, deterioration of the mold is reduced to prolong a life-cycle of the mold even when the mold is repeatedly closed and opened.

To solve the above-mentioned problem, in one aspect of the present invention, there is provided a mold for an optical component including a first mold and a second mold which mold the optical component, a trunk mold which centers the first mold and the second mold coaxially, a supporting means which supports the first mold and the trunk mold in such a way that the first mold and the trunk mold move against each other, a holding means which holds the first mold, the trunk mold, and the supporting means in such a way that the first mold, the trunk mold, and the supporting means are not separated from one other.

According to the present invention including such means, when the mold is closed and opened, the first mold and the trunk mold move against each other through the supporting means. Thus, when the mold is closed, the first mold and the second mold are centered coaxially. Then, the mold can be opened without pulling out of the first mold from the trunk mold. Therefore, the mold is repeatedly closed and opened in such a way that the holding means keeps the first mold and the trunk mold not separated from one other. Thus, optical components can be mass-produced.

In the mold for the optical component, the holding means may include a linking means which links the first mold with the trunk mold and arbitrarily expands and contracts.

In the mold for the optical component, the trunk mold may cause a first tapered surface on a side of the trunk mold to contact a second tapered surface on a side of the second mold to center the first mold and the second mold coaxially.

The mold for the optical component may include a centering means which centers the second mold and the second tapered surface coaxially.

In the mold for the optical component, the trunk mold may center the first mold and the second mold coaxially by means of an outside attachment which circumscribes outer peripheral surfaces of the trunk mold and the second mold.

BRIEF DESCRIPTION OF THE DRAWINGS

The above and other aspects, other advantages and further features of the present invention will become more apparent by describing in detail illustrative, non-limiting embodiments thereof with reference to the accompanying drawings, in which:

FIG. 1A shows an exploded perspective view of a mold for an optical lens according to an embodiment of the present invention;

FIG. 1B shows an assembly drawing of the mold for the optical lens according to the embodiment of the present invention;

FIG. 2A is a drawing showing one of a series of process steps to mold an optical lens by a mold for the optical lens which is operated by a presser, according to an embodiment of the present invention;

FIG. 2B is a drawing showing one of the series of the process steps to mold the optical lens by the mold for the optical lens which is operated by the presser, according to the embodiment of the present invention;

FIG. 2C is a drawing showing one of the series of the process steps to mold the optical lens by the mold for the optical lens which is operated by the presser, according to the embodiment of the present invention;

FIG. 2D is a drawing showing one of the series of the process steps to mold the optical lens by the mold for the optical lens which is operated by the presser, according to the embodiment of the present invention;

FIG. 3A1 is a drawing showing a state where a mold for an optical lens is opened, according to another embodiment of the present invention;

FIG. 3A2 is a drawing showing a state where the mold for the optical lens is closed, according to the embodiment;

FIG. 3B1 is a drawing showing a state where a mold for an optical lens is opened, according to another embodiment of the present invention;

FIG. 3B2 is a drawing showing a state where the mold for the optical lens is closed, according to the embodiment;

FIG. 3C1 is a drawing showing a state where a mold for an optical lens is opened, according to another embodiment of the present invention;

FIG. 3C2 is a drawing showing a state where the mold for the optical lens is closed, according to the embodiment; and FIG. 3C3 is a drawing showing a top view of the mold for the optical lens according to the embodiment.

DESCRIPTION OF THE PREFERRED EMBODIMENTS

Here will be described embodiments of the present invention, referring to the accompanying drawings as needed.

Referring to FIGS. 1A and 1B, there will be described a mold for an optical lens (an optical component) according to an embodiment of the present invention.

As shown in an exploded perspective view in FIG. 1A and an assembly drawing in FIG. 1B, the mold 1 for the optical lens according to the embodiment includes a lower mold 10 (a second mold), an upper mold 20 (a first mold), a cylindrical body 30, a trunk mold 40, and a supporting means 50.

In the mold 1 for the optical lens with such a structure, a heat-softened lens material (not shown) is pressed with the lower mold 10 and the upper mold 20 to be molded into an optical lens 92 (See FIG. 2D). As shown in FIG. 1B, the mold 1 for the optical lens can align a second symmetry axis P of the lower mold 10 with a first symmetry axis Q of the upper mold 20 and then perform pressing. Therefore, the mold 1 can provide the optical lens 92 (See FIG. 2D) which is highly accurately centered.

As shown in FIG. 1A, the lower mold 10 (the second mold) has a reference plane 11, a mold curved surface 12, and a lateral surface 13. In the lower mold 10 with such a structure, which is placed on a horizontal surface (See FIG. 2A), a lens surface is formed on a heat-softened lens material (not shown) which is placed on the mold curved surface 12. Thus, the reference plane 11, the mold curved surface 12, and the lateral surface 13 are formed in the lower mold 10 so as to share the second symmetry axis P as a common rotational symmetry axis. In general, to produce such a structure, a workpiece is fixed to a main axis (which is identical with the second symmetry axis P) of a lathe machine, rotated, and machined with a bit which is placed on a carriage and moves back and forth and left and right.

The reference plane 11 of the lower mold 10, which is formed in a plane orthogonal to the second symmetry axis P, is a portion which contacts a horizontal surface of a fixed plate 81 (see FIG. 2A), which will be described later.

The mold curved surface 12 of the lower mold 10 is a curved surface which molds a lens surface on one side of the optical lens, which is not shown in the figure. The shape of the mold curved surface 12 matches the shape of the lens surface on the side. Moreover, a tangential plane of the mold curved surface 12 at a point where the mold curved surface 12 intersects with the second symmetry axis P is orthogonal to the second symmetry axis P. Therefore, the tangential plane is parallel to the reference plane 11.

The lateral surface 13 of the lower mold 10 contacts an inner peripheral surface 32 of the cylindrical body 30, which will be described later, and fixes the lower mold 10 coaxially with the cylindrical body 30. It is preferred that the lateral surface 13 of the lower mold 10 is tightly fixed onto the inner peripheral surface 32 of the cylindrical body by means of, for instance, shrink fitting so that there is no play left between the lateral surface 13 of the lower mold 10 and the inner peripheral surface 32.

The upper mold 20 (the first mold) has a reference plane 21, a mold curved surface 22, and a lateral surface 23. The upper mold 20 with such a structure presses a heat-softened lens material (not shown) which is placed on the lower mold 10 to mold a lens surface. Moreover, the reference plane 21, the mold curved surface 22, and the lateral surface 23 are formed in the upper mold 20 so as to share the first symmetry axis Q as a common rotational symmetry axis.

In the case where shapes of both lens surfaces of the optical lens to be processed are the same, (that is, when the mold curved surface 12 of the lower mold 10 and the mold curved surface 22 of the upper mold 20 have an identical shape), the structure of the upper mold 20 can be identical to that of the lower mold 10. Accordingly, it is possible to reduce the number of forms of components in the mold 1 for the optical lens, as well as, the manufacturing cost.

The reference plane 21 of the upper mold 20, which is formed in a plane orthogonal to the first symmetry axis Q, is a portion which contacts a horizontal surface of a movable plate 82 (see FIG. 2A), which will be described later.

The mold curved surface 22 of the upper mold 20 is a curved surface which molds a lens surface on an opposite side to the above-mentioned side of the optical lens, which is not shown in the figure. The shape of the mold curved surface 22 matches the shape of the lens surface on the opposite side. Moreover, a tangential plane of the mold curved surface 22 at a point where the mold curved surface 22 intersects with the first symmetry axis Q is orthogonal to the first symmetry axis Q. Therefore, the tangential plane is parallel to the reference plane 21.

Due to such a relationship, it is only required to place the reference plane 11 of the lower mold 10 parallel to the reference plane 21 of the upper mold 20 in order to make the rotational symmetry axes (the first and second symmetry axes P and Q) of the lens surfaces on both sides of the optical lens parallel to each other.

The lateral surface 23 of the upper mold 20 contacts an inner peripheral surface 42 of the trunk mold 40, which will be described later, through the supporting means 50, which will be described later. In other words, the upper mold 20 moves relatively to the trunk mold 40 in parallel with the first symmetry axis Q so as to keep the first symmetry axis Q being the rotational symmetry axis of the upper mold 20. Then, the upper mold 20 is inserted in the trunk mold 40 to be placed coaxially with the trunk mold 40. Thus, there is a space between the lateral surface 23 of the upper mold 20 and the inner peripheral surface 42 of the trunk mold.

A stopper 24 (a holding means) fits into a lower portion of the upper mold 20 and protrudes outward from the lateral surface 23 of the upper mold 20 so that an end of the protruded stopper does not contact the inner peripheral surface 42 of the trunk mold 40 into which the upper mold 20 is inserted. The stopper 24 with such a structure prevents the supporting means 50, which moves in the space between the lateral surface 23 of the upper mold 20 and the inner peripheral surface 42 of the trunk mold 40, from popping out of the space.

The cylindrical body 30 has a second tapered surface 31, an inner peripheral surface 32, and an outer peripheral surface 33. The rotational symmetry axis of the cylindrical body 30 is identical with the second symmetry axis P which is the rotational symmetry axis of the second mold 10. In addition, the cylindrical body 30 is connected with the trunk mold 40 so that the second symmetry axis P is identical with the first symmetry axis Q.

The second tapered surface 31 is a conic side surface which is formed in a convex shape coaxially with the inner peripheral surface 32 which contacts the lateral surface 13 of the lower mold 10. Then, the second tapered surface 31 contacts a first tapered surface 41 of the trunk mold 40, which will be described later, and connects the trunk mold 40 coaxially with the cylindrical body 30. Due to the second tapered surface 31 with such a structure, the cylindrical body 30 and the trunk mold 40 are connected with each other so that the first symmetry axis Q is identical with the second symmetry axis P.

The shape of the outer peripheral surface 33 of the cylindrical body does not need to be limited in particular. However, in view of manufacturing cost, it is more advantageous that the outer peripheral surface 33 is processed coaxially with the inner peripheral surface 32, having a diameter equal to that of an outer peripheral surface 43 of the trunk mold 40.

The trunk mold 40 has the first tapered surface 41, the inner peripheral surface 42, the outer peripheral surface 43, and a stopper 44. The rotational symmetry axis of the trunk mold 40 is the first symmetry axis Q which is the rotational symmetry axis of the first mold 20, and is connected with the cylindrical body 30 so that the first symmetry axis Q is identical with the second symmetry axis P.

The first tapered surface 41 is a conic side surface which is formed in a concave shape coaxially with an inner surface 42 which is coaxial with a lateral surface 23 of the upper mold 20. Then, the first tapered surface 41 contacts the second tapered surface 31 of the cylindrical body 30 so that the cylindrical body 30 is connected with the trunk mold 40. Due to the first tapered surface 41 with such a structure, the cylindrical body 30 and the trunk mold 40 are connected with each other so that the first symmetry axis Q is identical with the second symmetry axis P.

The diameter of the inner peripheral surface 42 of the trunk mold is larger than that of the lateral surface 23 of the inserted upper mold 20. Moreover, the upper mold 20 is inserted in the trunk mold 40 to form a space between the lateral surface 23 of the upper mold 20 and the inner peripheral surface 42 of the trunk mold. Then, the supporting means 50 is placed in the space. Thus, the supporting means 50 makes the lateral surface 23 of the upper mold 20 and the inner peripheral surface 42 of the trunk mold move in opposite directions without contact each other so that the upper mold 20 moves against the trunk mold 40 in parallel with the first symmetry axis Q.

The stopper 44 (holding means) fits into the upper portion of the trunk mold 40 from the side of the outer peripheral surface 43 and protrudes inward from the inner peripheral surface 42 so that an end of the stopper 44 does not contact the lateral surface 23 of the upper mold 20 which is inserted in the trunk mold 40. The stopper 44 with such a structure prevents the supporting means 50, which moves in the space between the lateral surface 23 of the upper mold 20 and the inner peripheral surface 42 of the trunk mold 40, from popping out of the space. The stoppers 24 and 44 keep the upper mold 20, the trunk mold 40, and the supporting means 50 not separated from one other.

The supporting means 50 includes balls 51 and a retainer 52. The supporting means 50 with such a structure centers the first mold 20 and the trunk mold 40 so that the first mold 20 and the trunk mold 40 share a common rotational symmetry axis (the first symmetry axis Q), and supports the both so that the both relatively move in parallel with the first symmetry axis Q so as to keep the first symmetry axis Q being the common rotational symmetry axis.

The balls 51 are placed and tightly inserted in the space between the lateral surface 23 of the upper mold 20 and the inner peripheral surface 42 of the trunk mold. Thus, the balls 51 roll but do not slide on both sides of the lateral surface 23 and the inner peripheral surface 42. The balls 51 with such a structure roll to send out the lateral surface 23 of the upper mold 20 and the inner peripheral surface 42 of the trunk mold respectively in opposite directions, so as to move the upper mold 20 relatively to the trunk mold 40 along the first symmetry axis Q.

The retainer 52 is formed in a cylindrical shape which is thinner than the space between the lateral surface 23 of the upper mold 20 and the inner peripheral surface 42 of the trunk mold. The retainer 52 has through holes through which the balls 51 can pass. The retainer 52 with such a structure prevents a plurality of the balls 51 which roll between the lateral surface 23 of the upper mold 20 and the inner peripheral surface 42 of the trunk mold from scattering out.

To install the supporting means 50, first of all, the supporting means 50 is placed around the lateral surface 23 of the upper mold 20, and the stopper 24 is fit in. Next, in a state where the supporting means 50 is placed around the lateral surface 23 of the upper mold 20, the upper mold 20 is inserted in the inner peripheral surface 42 of the trunk mold 40, and the stopper 44 is fit in.

Thus, the upper mold 20, the trunk mold 40, and the supporting means 50 are combined. Accordingly, as shown in FIG. 1B, the upper end of the supporting means 50 is blocked by the stopper 44. In addition, the lower end of the supporting means 50 is blocked by the stopper 24. Therefore, it is possible to prevent the upper mold 20 from separating from the trunk mold 40.

Next, referring to FIGS. 2A-2D, operation of a mold for an optical lens according to the embodiment will be discussed.

First of all, a presser 80 which operates the mold for the optical lens is described.

The presser 80 includes a fixed plate 81, a movable plate 82, a fastening means 83, and a linking means 84. The presser 80 with such a structure provides pressing force necessary to transform the heat-softened lens material 91 and closes the lower mold 10 and the upper mold 20 with one press stroke to mold an optical lens 92.

The fixed plate 81 is placed so that the lower mold 10 and the cylindrical body 30 are combined and placed on a horizontal surface which is a top surface of the fixed plate 81.

The movable plate 82 moves in direction to increase or decrease a distance between the movable plate 82 and the fixed plate 81 keeping the horizontal surface which is a bottom surface of the movable plate 82 parallel to the top surface of the fixed plate 81. Hereafter, a position of the movable plate 82 where the distance between the fixed plate 81 and the movable plate 82 is largest is referred to as a top dead center. Meanwhile, a position where the distance is smallest is referred to as a bottom dead center. In other words, when the movable plate 82 is located at the top dead center, the mold is opened. At this time, it is possible to put the lens material 91 in or take the molded optical lens 92 out of the mold. On the other hand, when the movable plate 82 is located at the bottom dead center, the mold is closed. At this time, the lens material 91 is pressed and molded into the optical lens 92.

The fastening means 83 fixes the upper mold 20 to the horizontal surface of the movable plate 82 without misalignment.

The linking means 84 (the holding means) includes an elastic member 85, a guide 86, and a rod 87. The linking means 84 with such a structure links the upper mold 20 with the trunk mold 40 and arbitrarily expands and contracts in order to constantly press the trunk mold 40 which moves along the first symmetry axis Q in a direction towards the fixed plate 81.

An elastic member 85 expands and contracts like a helical spring to generate pressing force. One end of the elastic member 85 presses the horizontal surface of the movable plate 82 while the other end presses the rod 87 which protrudes from the outer peripheral surface of the trunk mold 40.

One end of the guide 86 is attached rigidly and vertically to the horizontal surface of the movable plate 82 while the other end is free.

One end of the rod 87 is fixed to the outer peripheral surface of the trunk mold 40, while the free end of the guide 86 is inserted in the other end of the rod 87. The rod 87 with such a structure is controlled to move in the longitudinal direction of the guide 86, and applies force towards the fixed plate 81 to the trunk mold 40 which moves in the same direction as the rod 87.

Next, operation of the presser 80 will be discussed.

First of all, as shown in FIG. 2A, a combination of the lower mold 10 on which heat-softened lens material 91 is placed and the cylindrical body 30 is installed on the fixed plate 81. Then, a combination of the upper mold 20 and the trunk mold 40 is fixed to the movable plate 82 which is located at the top dead center. In such a state, force is applied downward to the trunk mold 40. However, the stoppers 24 and 44 hold the trunk mold 40 so that the trunk mold 40 is not separated from the upper mold 20 (see FIG. 1B). In addition, in this state, it is supposed that the lower mold 10 is installed on the fixed plate 81 so that the second symmetry axis P is misaligned with the first symmetry axis Q of the upper mold 20.

Next, as shown in FIG. 2B, the movable plate 82 is moved in the direction to the fixed plate 81 so that the cylindrical body 30 contacts the trunk mold 40. At this time, the first tapered surface 41 applies force of the linking means 84 to the second tapered surface 31 to contact the second tapered surface 31. Therefore, the lower mold 10 a little moves on the fixed plate 81 in the horizontal direction to cause the second symmetry axis P and the first symmetry axis Q, which have been misaligned with each other, to be identical. After that, when the movable plate 82 further moves downward in a state where the second tapered surface 31 and the first tapered surface 41 contact each other, the upper mold 20 moves relatively to the trunk mold 40 by means of operation of the supporting means 50 and presses the lens material 91.

After that, as shown in FIG. 2C, the movable plate 82 stops when the lens material 91 has been pressed to have a predetermined thickness. Then, the movable plate 82 stays in this state for a while until the lens material 91 is cooled.

Next, as shown in FIG. 2D, the movable plate 82 moves in the opposite direction to the fixed plate 81 when the lens material 91 has been cooled and solidified. Then, the lower mold 10 is separated from the upper mold 20 so that the mold is opened. At the same time, the cylindrical body 30 is separated from the trunk mold 40 so that it is possible to take out the molded optical lens 92.

After the optical lens 92 is taken out, operation of the lower mold 10 and the upper mold 20 returns to the process step shown in FIG. 2A. Then, another lens material 91 is supplied so that optical lenses 92 are repeatedly produced in mass-production.

Next, referring to FIGS. 3A1-3C3, other embodiments of a mold for an optical lens according to the present invention will be described.

First of all, a mold 1a of an optical lens according to another embodiment shown in FIGS. 3A1 and 3A2 is different from the mold 1 for the optical lens shown in FIG. 1 in a structure of a lower mold 10a and a cylindrical body 30a. Moreover, FIG. 3A1 shows a state where the mold 1a for the optical lens is opened, while FIG. 3A2 shows a state where the mold 1a for the optical lens is closed.

Here, when the lower mold 10a and the cylindrical body 30a are placed coaxially, there is a space between the lower mold 10a and the cylindrical body 30a. In this case, a centering means 60 is placed in the space. The second mold (the lower mold) 10a and the cylindrical body 30a are centered by the centering means 60 so as to share the second symmetry axis P as the common rotational symmetry axis.

Since the mold 1a for the optical lens is constructed as shown in FIGS. 3A1 and 3A2, a pipe material which is used to produce the trunk mold 40 can be used in common to produce the cylindrical body 30a. In addition, same material can be used to produce the centering means 60 and the supporting means 50. Accordingly, after a commercial pipe material is cut to an appropriate length, merely the second tapered surface 31a and the first tapered surface 41 are cut-processed respectively to produce the cylindrical body 30a and the trunk mold 40. As a result, the mold 1a for the optical lens contributes to reducing the manufacturing cost.

As shown in FIGS. 3A1 and 3A2, in the mold 1a for the optical lens, the second tapered surface 31a is convex while the first tapered surface 41 is concave. In the mold 1a for the optical lens with such a structure, the molded optical lens is exposed between outer peripheral surfaces of the mold in the state where the mold is opened. Therefore, it is easy to take out the molded optical lens and insert the lens material.

Moreover, a mold 1b of an optical lens according to another embodiment shown in FIGS. 3B1 and 3B2 is different from the mold 1 for the optical lens shown in FIG. 1 in a structure of a cylindrical body 30b and a trunk mold 40b. FIG. 3B1 shows a state where the mold 1b for the optical lens is opened while FIG. 3B2 shows a state where the mold 1b for the optical lens is closed.

In other words, the second tapered surface 31b is concave while the first tapered surface 41b is convex. In the mold 1b for the optical lens with such a structure, it is possible to reduce a mass of the trunk mold 40 which is able to move a relatively long distance. Accordingly, since load of the supporting means 50 and abrasion decreases, it is possible to extend a life-cycle of the mold 1b for the optical lens. In the structure shown in FIGS. 3B1 and 3B2, the centering means 60 shown in FIGS. 3A1 and 3A2 may be applied to the combination of the lower mold 10 and the cylindrical body 30 though it is not shown in the FIGS.

Moreover, a mold 1c of an optical lens according to another embodiment shown in FIGS. 3C1, 3C2, and 3C3 has outside attachments 70 which circumscribe outer peripheral surfaces of the cylindrical body 30c and the trunk mold 40c.

FIG. 3C1 shows a state where the mold 1c for the optical lens is opened, FIG. 3C2 shows a state where the mold 1c for the optical lens is closed, and FIG. 3C3 shows a top view of the state where the mold is closed. Here, a cylindrical body 30c and a trunk mold 40c, none of which has a tapered surface, are both cylindrical with equal outside diameters.

As shown in FIG. 3C3, at least two sides of each of the outside attachments 70 contact peripheral surfaces of the outer the cylindrical body 30c and the trunk mold 40c. When the outside attachments 70 with such a structure contact the outer peripheral surfaces of the cylindrical body 30c and the trunk mold 40c, the cylindrical body 30c is connected coaxially with the trunk mold 40c (so that a second symmetry axis P is identical with a first symmetry axis Q).

In the structure shown in FIGS. 3C1, 3C2, and 3C3, the centering means 60 in FIGS. 3A1 and 3A2 may be applied to a combination of the lower mold 10 and the cylindrical body 30c though it is not shown in the FIGS. In the mold 1c for the optical lens with such a structure, the pipe material which is used to produce the trunk mold 40c is used in common to produce the cylindrical body 30c. Thus, a commercial pipe material is merely cut to an appropriate length to produce the cylindrical body 30c and the trunk mold 40c for application. Therefore, the mold 1c for the optical lens can reduce the manufacturing cost.

The embodiments have been illustrated and described with reference to the molds of the optical lens according to the present invention, above. However, the present invention is not limited to the embodiments. For instance, the second mold 10 and the cylindrical body 30 may be integrated into a piece so as to share the second symmetry axis P as the common rotational symmetry axis.

Moreover, the tapered surfaces 41 and 31 and the outside attachment 70 have been illustrated and described as a connecting means which connects the cylindrical body 30 coaxially with the trunk mold 40. However, the connecting means, which is a component of the present invention, is not limited to this. For instance, other devices which are appropriate to connect the cylindrical body 30 coaxially with the trunk mold 40 may be used.

Moreover, description has been given to an optical lens as an example of an optical component. However, the present invention is not limited to this. Besides an optical lens, optical components to which the present invention can be applied include a mirror frame which supports an optical lens, a prism, and so on.

The molds of the optical lens according to the present invention with such structures described above provide the following effects.

In a mold for an optical lens according to the present invention, a cylindrical body 30 contacts a trunk mold 40. Accordingly, a lower mold 10 and an upper mold 20 which are respectively inserted in the cylindrical body 30 and the trunk mold 40 are coaxial with each other to perform molding. Thus, it is possible to produce a highly accurately centered optical lens. Moreover, after the mold for the optical lens is closed, to open the mold to take out a molded optical lens, the trunk mold 40 is separated from the cylindrical body 30. Therefore, the upper mold 20 does not need to be separated from and pulled out of the trunk mold 40. Consequently, even when the mold for the optical lens is repeatedly closed and opened, a portion where the upper mold 20 contacts the trunk mold 40 is hardly worn-out or damaged. As a result, the mold can be used for a long life-cycle.

According to the present invention, there is provided a mold for an optical component which can improve accuracy of centering the optical component, in which deterioration is reduced even when the mold is repeatedly closed and opened, and whose life-cycle is long.

While the described embodiments represent the preferred forms of the present invention, it is to be distinctly understood that the present invention is not limited thereto but may be otherwise variously embodied within the spirit and scope of the following claims.

What is claimed is:

1. A method of pressing a material softened by heating and an optical component comprising:
   providing a first mold and a second mold which mold the optical component;
   providing a trunk mold which centers the first mold and the second mold coaxially;
   providing a supporting device which supports the first mold and the trunk mold in such a way that the first mold and the trunk mold are centered so as to comprise a common rotational symmetry axis and relatively move along the common rotational symmetry axis;
   providing a holding device which holds the first mold, the trunk mold, and the supporting device in such a way that the first mold, the trunk mold, and the supporting device are not separated from one another;
   wherein the trunk mold causes a first tapered surface on a side of the trunk mold to contact a second tapered surface on a side of the second mold to center the first mold and the second mold coaxially and to make the first mold and the second mold share the common rotational symmetry axis, and
   wherein after the first mold and the second mold are centered, the trunk mold is held substantially stationary while the material is pressed,
   wherein pressing the material comprises moving the first mold relative to the second mold along the common rotational symmetry axis with respect to the trunk mold, such that the material is pressed between the first and second molds, whereby a molded product having a desired thickness and a shape is obtained.

2. The method as claimed in claim 1, further comprising:
   providing a centering device which centers the second mold and the second tapered surface coaxially.

3. A method for pressing material softened by heating and an optical component comprising:
   providing a first mold and a second mold which mold the optical component;
   providing a trunk mold which centers the first mold and the second mold coaxially;
   providing a supporting device which supports the first mold and the trunk mold in such a way that the first mold and the trunk mold are centered so as to comprise a common rotational symmetry axis and relatively move along the common rotational symmetry axis;
   providing a holding device which holds the first mold, the trunk mold, and the supporting device in such a way that the first mold, the trunk mold, and the supporting device are not separated from one another;
   wherein the trunk mold centers the first mold and the second mold coaxially so as to make the first mold and second mold share the common rotational symmetry axis by means of an outside attachment which circumscribes outer peripheral surfaces of the trunk mold and the second mold, and
   wherein after the first mold and the second mold are centered, the trunk mold is held substantially stationary while the material is pressed,
   wherein pressing the material comprises moving the first mold relative to the second mold along the common rotational symmetry axis with respect to the trunk mold, such that the material is pressed between the first and second molds, whereby a molded product having a desired thickness and a shape is obtained.

4. The method of claim 1, wherein there is a gap between the first and second molds when they are brought together to mold the optical component.

5. The method of claim 1, wherein the holding device comprises a linking device which links the first mold with the trunk mold and expands and contracts,
   wherein the linking device includes an elastic member configured to apply force to the first tapered surface and the second tapered surface.

6. The method of claim 1, wherein the supporting device comprises a plurality of balls and a retainer.

7. The method of claim 3, wherein the supporting device comprises a plurality of balls and a retainer.

8. The method of claim 1, wherein the holding device comprises a linking device which links the first mold with the trunk mold and expands and contracts.

9. The method of claim 1, wherein the thickness of the molded product is directly related to a length of a press stroke which moves the first mold relative to the second mold during pressing.

10. The method of claim 1, wherein the holding device exerts a force only on the trunk mold.

11. The method of claim 1, wherein the holding device exerts a force partially on the trunk mold.

* * * * *